March 24, 1931.  W. S. GRIFFITH  1,797,979
BELT SKIVING MACHINE
Filed April 30, 1929   2 Sheets-Sheet 1
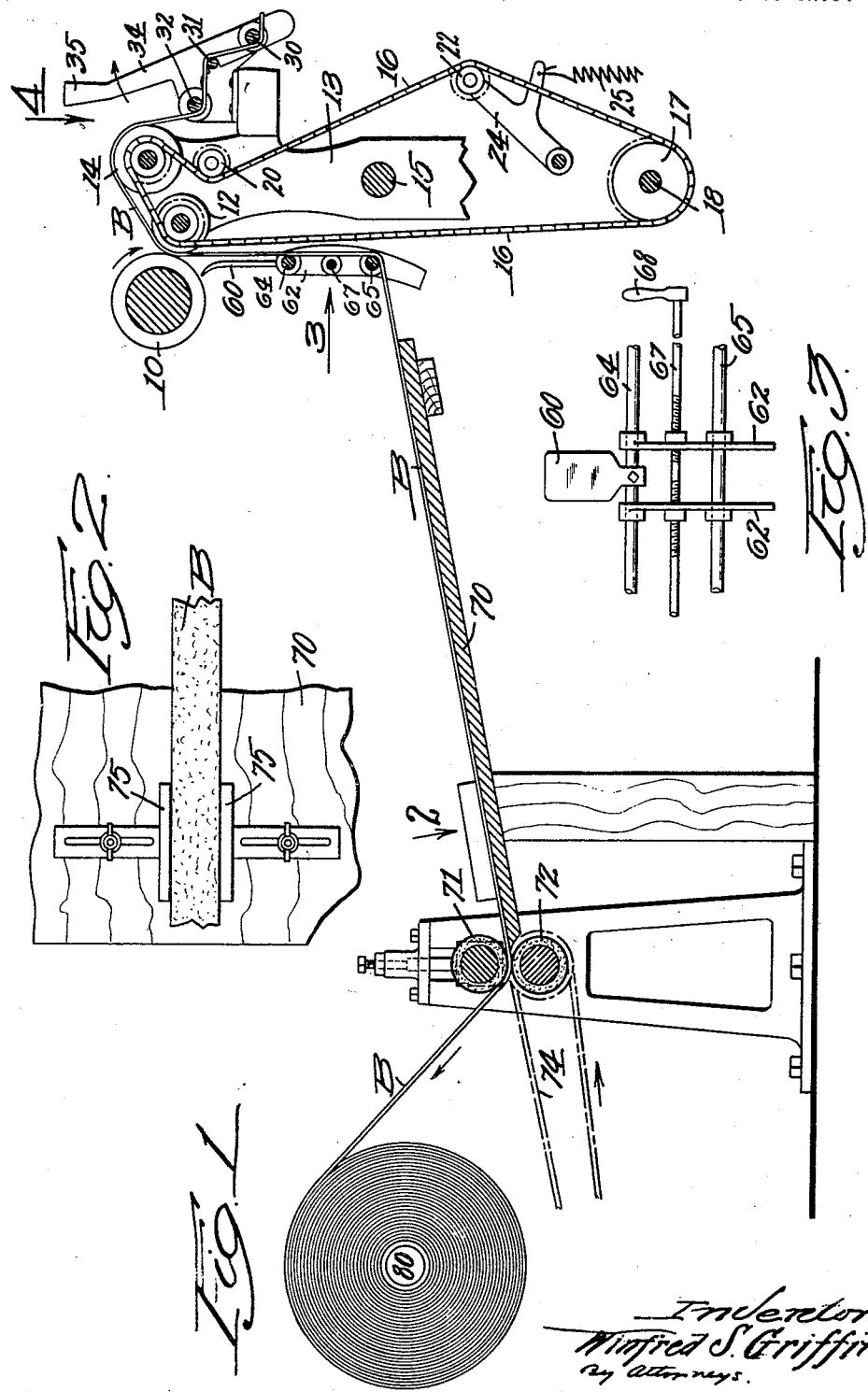

March 24, 1931.  W. S. GRIFFITH  1,797,979
BELT SKIVING MACHINE
Filed April 30, 1929  2 Sheets-Sheet 2
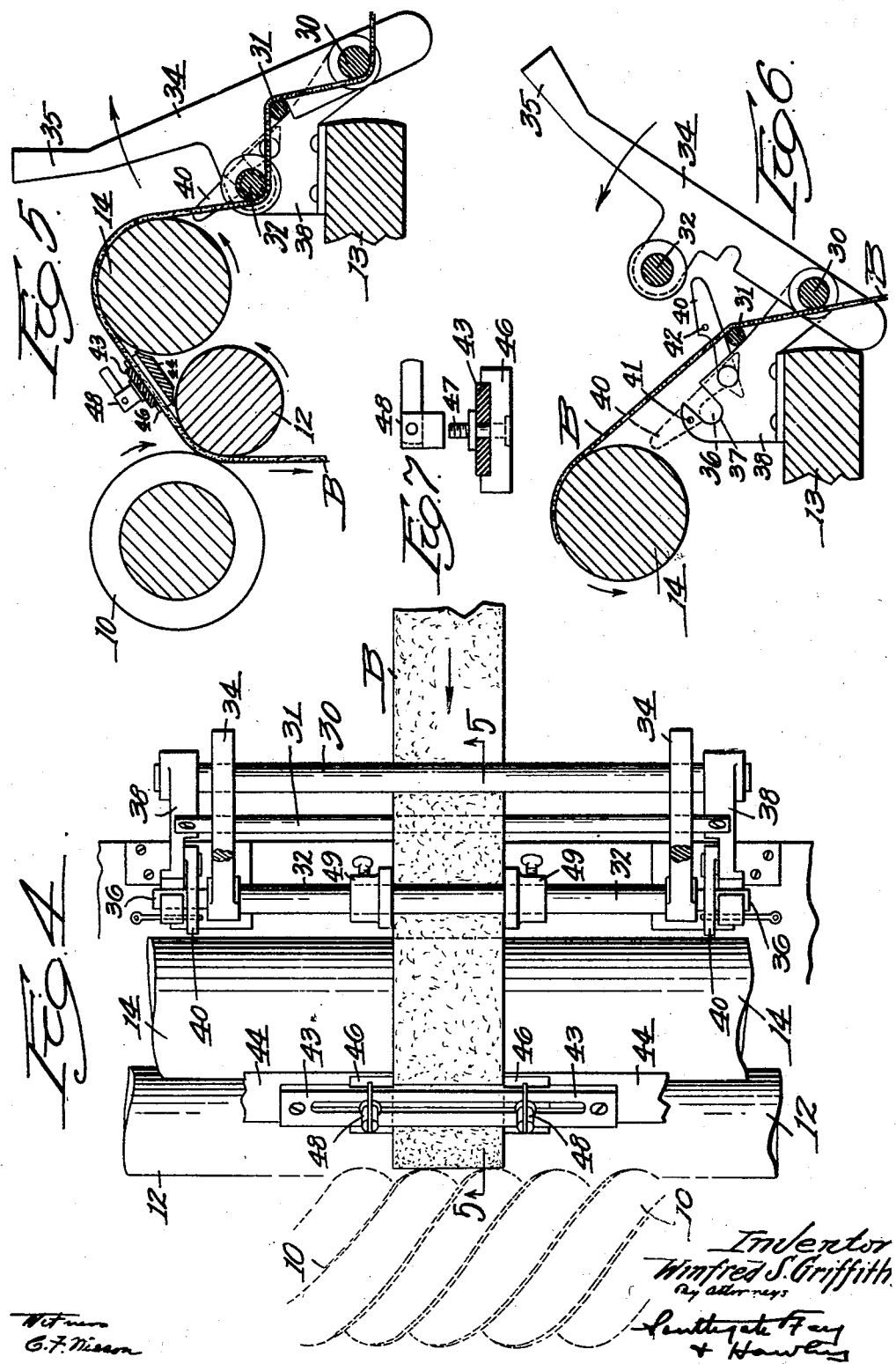
Inventor
Winfred S. Griffith Patented Mar. 24, 1931

1,797,979

UNITED STATES PATENT OFFICE

WINFRED S. GRIFFITH, OF WORCESTER, MASSACHUSETTS, ASSIGNOR TO GRATON & KNIGHT COMPANY, OF WORCESTER, MASSACHUSETTS, A CORPORATION OF MASSACHUSETTS

BELT-SKIVING MACHINE

Application filed April 30, 1929. Serial No. 359,371.

This invention relates to the manufacture of leather belts and more particularly to the skiving of spindle belts and other high speed belts which must be of substantially uniform thickness throughout their length.

It is the object of my invention to provide a machine by which such belts may be readily a skived to such uniform thickness and by which uneven thickness at the laps or joints will be avoided.

Further objects of the invention are the provision of devices by which the insertion of the belt in the machine will be facilitated and the provision of mechanism by which the belt will be drawn through the machine under substantial tension. I also provide means for flexing or "breaking" the belt, rendering it much more pliable, particularly at the joints, prior to the skiving operation.

My invention further relates to arrangements and combinations of parts which will be hereinafter described and more particularly pointed out in the appended claims.

A preferred form of the invention is shown in the drawings in which

Fig. 1 is a sectional side elevation of my improved skiving machine;

Fig. 2 is a detail plan view, looking in the direction of the arrow 2 in Fig. 1;

Fig. 3 is a detail end elevation, looking in the direction of the arrow 3 in Fig. 1;

Fig. 4 is an enlarged partial plan view, looking in the direction of the arrow 4 in Fig. 1;

Fig. 5 is an enlarged sectional side elevation, taken along the line 5—5 in Fig. 4;

Fig. 6 is a view similar to Fig. 5 but showing certain parts in a different position, and Fig. 7 is a side elevation, partly in section, of certain guiding devices.

Referring to the drawings, my improved belt skiving machine comprises a rotary cutter cylinder 10, mounted in a supporting frame and preferably having a series of spirally arranged cutting edges, as indicated in Fig. 4. A feed roll 12 is rotatably mounted in a movable frame 13, mounted to swing about a fixed pivot 15 toward and away from the rotary cutter 10. A guide-roll 14 is also rotatably mounted in the upper end of the swinging frame 13. The feed roll 12 and guide-roll 14 are positively rotated by a belt or chain 16 passing around a pulley or sprocket 17 on a drive shaft 18.

A guide-roll 20 for the chain 16 is provided on the frame 13 below the roll 14 and a second guide-roll 22 is mounted on a tightener lever 24, yieldingly pressed against the chain 16 by a spring 25. The lever 24 acts to keep the chain 16 tight in every position of the swinging frame 13. Suitable stops are provided by which the limit of movement of the feed roll 12 toward the cutter 10 may be adjustably determined.

As the belt B approaches the guide-roll 14, it is drawn around a series of guide-bars 30, 31 and 32, by which it is alternately flexed in opposite directions, which flexing produces the effect of "breaking" the stiffness of the belt and rendering the belt much more pliable, particularly at the overlapping joints where successive sections of the belt are glued or cemented together.

The guide-bars 30 and 31 are mounted in fixed position, but the guide-bar 32 is mounted in swinging frame members 34, one or both of which are provided with handle portions 35. The frame 34 swings about the axis of the fixed bar 30. When the roll 32 is in operative position, reduced end portions 36 of the roll are received in notches or bearings 37 in the fixed stand 38 on which the guide-bars 30 and 31 are mounted. Latches 40 are pivoted to the stand 38 and may be swung over to the dotted line position indicated in Fig. 6, where they may be secured by inserting locking pins through openings 41 and 42 in the stand 38 and latches 40 respectively.

By mounting the guiding bar 32 in the swinging frame 34, the threading up of a stiff belt is greatly facilitated, as the belt may be easily inserted in the position indicated in Fig. 6, after which the frame 34 is swung downward and locked in operative position, causing the belt B to assume and thereafter follow the tortuous path indicated in Fig. 5.

A slotted guide support 43 (Figs. 4 and 7) is mounted on a cross bar 44 between the feed roll 12 and the guide-roll 14 and is provided with a pair of edge guides 46 slidable transversely in the support 43 and secured in adjusted position by clamping bolts 47 and handle nuts 48. The edge guides 46 accurately position the belt transversely at a point closely adjacent the rotary cutter 10. Additional guiding collars 49 (Fig. 4) may be mounted on the guide-bar 32 to direct the belt B between the guiding plates 46 previously described.

As the belt B passes downward from the cutter 10 and feed roll 12, it engages a guide plate 60 (Figs. 1 and 3) and is guided between side plates 62 slidably mounted on guide rods 64 and 65 (Fig. 3). An adjusting rod 67 is threaded into the guide-plates 62 and is provided with right and left hand threads, so that rotation of the rod 67 causes the plates 62 to have simultaneous movement, either toward or away from each other, the plates remaining substantially centered with respect to the guide member 60. The rod 67 extends to the side of the machine and is provided with a suitable handle 68.

The belt B then passes around the lower guide rod or support 65 and is conducted over a rearwardly inclined table 70 and between upper and lower drawing rolls 71 and 72. The lower roll 72 is preferably positively rotated by a chain 74 while the upper roll rotates by contact with the belt B.

The rolls 71 and 72 are preferably provided with rubber or cushion surfaces by which the belt B is tightly gripped and drawn downward under tension from the cutter 10 and feed roll 12. Suitable side guiding members 75 (Figs. 1 and 2) are adjustably mounted at the lower end of the table 70 and guide the belt in a predetermined path to the drawing rolls 71 and 72. As the belt leaves the drawing rolls, it is wound on a drum 80 which is frictionally rotated by suitable driving means, not shown.

Having described the details of construction of my improved skiving machine, the method of operation and advantages thereof are as follows:

When threading up the machine, the guide-bar 32 is swung forward to the position indicated in Fig. 6, and the belt is passed upward between the guide-bars 30 and 31 and around the upper guide-roll 14. The belt is then passed downward between the edge guides 46 and between the feed roll 12 and cutter 10. The belt is then directed downward by the guide-plate 60 (Fig. 1), in front of the rods 64 and 65 and between the guide-plates 62. The belt is then manually directed over the table 70 and between the guides 75 to the drawing rolls 71 and 72 and is thereafter connected to the winding drum 80.

The guide-bar 32 is then swung rearward and locked in position, as indicated in Fig. 5, and the swinging frame 13 is forced rearward, bringing the feed roll 12 to its predetermined position relative to the rotary cutter 10. The machine is then started in operation and the belt is quickly and rapidly skived to uniform thickness.

As the belt is drawn around the guide-bars 30, 31 and 32, the abrupt alternate flexing of the belt breaks down the stiffness of the cemented joints and renders the entire belt more pliable, so that it closely engages the surface of the feed roll 12 and is skived to a substantially uniform thickness, instead of presenting uneven thickness at the joints, as has been the common experience heretofore when attempting to skive cemented belts.

The uniform operation of the cutter 10 is also greatly facilitated by the fact that the drawing rolls 71 and 72 keep the belt under substantial tension, causing the belt to hug closely to the feed roll 12 as it passes the rotary cutter 10. In actual operation, my improved skiving machine has been found effective to produce belts for high speed purposes in which variations in thickness have been so reduced as to be entirely negligible. The machine is capable of operating at high speed and of producing large quantities of accurately skived belt with a minimum expenditure of time and labor.

Having thus described my invention and the advantages thereof, I do not wish to be limited to the details herein disclosed, otherwise than as set forth in the claims, but what I claim is:—

1. In a flat belt skiving machine, a cylindrical rotary cutter, a feed roll rotatably mounted adjacent and parallel thereto and effective to hold a flat belt in engagement with said cutter, means to positively rotate said feed roll, means to guide a belt to said feed roll and cutter, and means to remove under tension said belt from said feed roll and cutter.

2. In a belt skiving machine, a rotary cutter, a feed roll rotatably mounted adjacent thereto, and means to guide a belt to said feed roll; said means including devices effective to give said belt a series of sharp flexing bends in successive opposite directions as the belt approaches the feed roll and cutter, thereby rendering said belt more pliable.

3. The combination in a belt skiving machine as set forth in claim 2, in which said bending devices comprise a pair of guide members mounted in fixed operative position and a third guide member mounted for movement to and from operative position.

4. The combination in a belt skiving machine as set forth in claim 2, in which said bending devices comprise a pair of guide members mounted in fixed operative position and a third guide member mounted on a swinging support by which it is movable toward and away from operative position, and in which means in provided to lock said support in operative position.

5. In a belt skiving machine, a rotary cutter, a feed roll rotatably mounted adjacent thereto, means to guide a belt to said feed roll and cutter, a pair of drawing rolls effective to tension the belt and draw said belt away from said feed roll and cutter, and means to wind up the belt as it leaves said drawing rolls.

6. The combination in a belt skiving machine as set forth in claim 5, in which edge guides for the belt are provided between the feed roll and the drawing rolls, and in which means is provided for adjusting said guides from the side of the machine.

7. The combination in a belt skiving machine as set forth in claim 5, in which edge guides for the belt are provided between the feed roll and the drawing rolls, and in which means is provided for simultaneously adjusting said guides equally in opposite directions from the side of the machine.

8. In a leather working machine, means to skive a belt, and means to repeatedly flex a belt as it approaches said skiving means.

9. In a leather working machine, means to skive a belt, and a series of guide-bars around which said belt is repeatedly flexed alternately in opposite directions as it approaches said skiving means.

10. In a leather working machine, means to skive a belt, means to repeatedly flex a belt as it approaches said skiving means, and means to pull said belt under tension from said skiving means.

In testimony whereof I have hereunto affixed my signature.

WINFRED S. GRIFFITH.